Jan. 3, 1928.

P. F. SHIVERS

INDUCTION MOTOR

Filed April 9, 1925

1,654,840

Inventor
Paul F. Shivers,

By Hood + Hahn.
Attorneys

Patented Jan. 3, 1928.

1,654,840

UNITED STATES PATENT OFFICE.

PAUL F. SHIVERS, OF WABASH, INDIANA, ASSIGNOR TO THE HONEYWELL HEATING SPECIALTIES COMPANY, OF WABASH, INDIANA, A CORPORATION OF INDIANA.

INDUCTION MOTOR.

Application filed April 9, 1925. Serial No. 21,774.

My invention relates to improvements in field magnet cores designed particularly for use in connection with alternating current motors.

One of the objects of my invention is to provide a field magnet core which will permit the easy winding of the cores.

A further object of my invention is to provide a laminated core wherein each pole piece may be separately wound and then assembled into a completed core.

For the purpose of disclosing my invention I have illustrated on embodiment thereof in the accompanying drawings in which Fig. 1 is a perspective view of assembled field magnet core embodying my invention the winding being left off for clearness of illustration;

Figure 1:
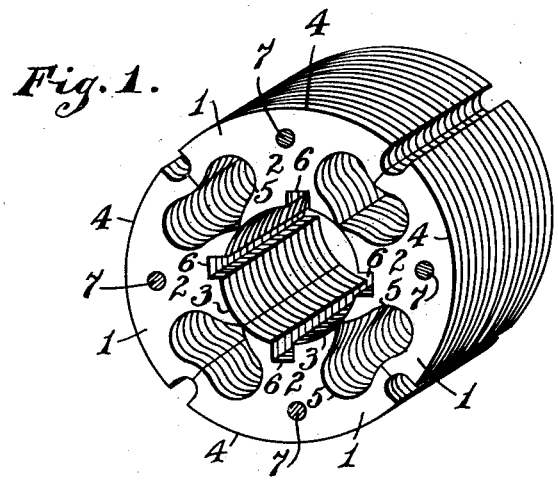
Figure 2:
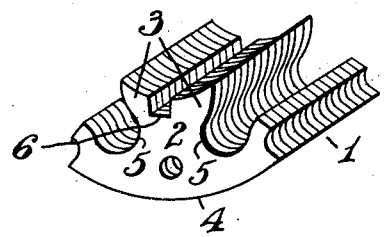
Fig. 2 is a perspective view of one of the segments thereof.
Figure 3:
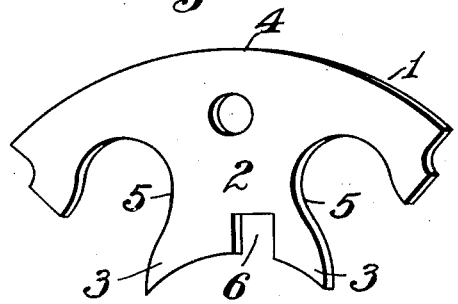
Fig. 3 is a front elevation of one of the segments of one lamination.

In the embodiment of the invention illustrated the field magnet core as shown comprises a series of laminations laid together in the usual manner. The magnet is preferably cylindrical in shape and each lamination comprises four quadrants 1 which are T shaped, the stem 2 of the T forming a pole piece and being widened at its bottom as at 3 and the top being rounded as at 4 so that when the quadrants are assembled they will form a substantially circular lamination provided with four radially extending pole pieces, the stems 2 forming the pole pieces and due to their widening at 3 being arranged to contact with the adjacent pole pieces, space however being provided as at 5 to accommodate the windings. Each of the pole pieces or stems is slotted at 6 to provide means for accommodating the winding of a shading coil.

In assembly, a series of laminations forming the completed quadrants of the core are assembled, being held together by bolts or rods 7 extending through openings in the heads of the T. The quadrants are then wound and after winding are assembled to form the completed core. This manner of construction permits of the winding of each pole piece separately thereby greatly facilitating the winding of the core.

I claim as my invention:

A field magnet composed of a circumferential series of laminated sections each lamination of each section having a pole stem having a circumferentially flared inner pole end and a circumferentially flared outer end, the tips of the outer end being radially separated from the tips of the pole end and substantially circumferentially extended to abut the tips of laminations of adjacent sections, and the tips of the pole end being substantially circumferentially extended to lie closely adjacent the tips of the laminations of the pole ends of adjacent sections.

In witness whereof, I, PAUL F. SHIVERS, have hereunto set my hand at Wabash, Indiana, this 6th day of April, A. D. one thousand nine hundred and twenty-five.

PAUL F. SHIVERS.